United States Patent
Bhattacharya et al.

(10) Patent No.: US 11,347,939 B2
(45) Date of Patent: May 31, 2022

(54) RESOLVING TEMPORAL AMBIGUITIES IN NATURAL LANGUAGE INPUTS LEVERAGING SYNTAX TREE PERMUTATIONS

(71) Applicant: Microsoft Technology Licensing, LLC, Redmond, WA (US)

(72) Inventors: Pamela Bhattacharya, Redmond, WA (US); Barun Patra, Pitsburgh, PA (US); Charles Yin-Che Lee, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 296 days.

(21) Appl. No.: 16/572,484

(22) Filed: Sep. 16, 2019

(65) Prior Publication Data
US 2021/0081494 A1    Mar. 18, 2021

(51) Int. Cl.
*G06F 40/211* (2020.01)
*G06N 20/00* (2019.01)
*G06F 40/30* (2020.01)
*G06Q 10/10* (2012.01)

(52) U.S. Cl.
CPC ............ *G06F 40/211* (2020.01); *G06F 40/30* (2020.01); *G06N 20/00* (2019.01); *G06Q 10/109* (2013.01)

(58) Field of Classification Search
None
See application file for complete search history.

(56) References Cited

U.S. PATENT DOCUMENTS

| 7,158,980 | B2 | 1/2007 | Shen |
| 8,375,099 | B2 | 2/2013 | Carroll et al. |
| 8,819,034 | B2 | 8/2014 | Vanden Heuvel et al. |
| 2008/0221903 | A1 | 9/2008 | Kanevsky et al. |
| 2009/0235280 | A1 | 9/2009 | Tannier et al. |
| 2015/0193392 | A1* | 7/2015 | Greenblatt ............ G06Q 10/109 715/205 |

(Continued)

OTHER PUBLICATIONS

Faiz, Rim, "Identifying Relevant Sentences in News Articles for Event Information Extraction", In International Journal of Computer Processing of Oriental Languages vol. 19, Issue 1, Mar. 2006, 19 Pages.

(Continued)

*Primary Examiner* — Quynh H Nguyen

(57) ABSTRACT

In non-limiting examples of the present disclosure, systems, methods and devices for resolving temporal ambiguities are presented. A natural language input may be received. A temporal component of the input may be identified. A determination may be made that the temporal component includes a conjunction that separates temporal meeting block alternatives. A temporal ambiguity may be identified in one of the meeting block alternatives. A plurality of syntax tree permutations may be generated for the meeting block alternative where the ambiguity was identified. A machine learning model that has been trained to identify a most relevant permutation for a given natural language input may be applied to each of the plurality of permutations. A temporal meeting block alternative corresponding to the most relevant permutation may be surfaced.

20 Claims, 11 Drawing Sheets

(56) References Cited

U.S. PATENT DOCUMENTS

2015/0278737 A1   10/2015   Chen huebscher et al.
2018/0123997 A1    5/2018   Celedonia et al.
2021/0273955 A1*  9/2021   Villella .................. G06N 20/10

OTHER PUBLICATIONS

"Automatically Add Events From Your Email to Your Calendar", Retrieved from: https://web.archive.org/web/20190511013633/https://support.office.com/en-us/article/automatically-add-events-from-your-email-to-your-calendar-32e5cf0c-3e65-4870-9ff9-df3683d3fc97, May 11, 2019, 5 Pages.

Stubbs, et al., "Natural Language Annotation for Machine Learning", Retrieved from: https://www.oreilly.com/library/view/natural-language-annotation/9781449332693/ch01.html, Jul. 19, 2019, 40 Pages.

Nath, et al., "NLP Based Event Extraction from Text Messages", In IOSR Journal of Computer Engineering, Jul. 19, 2019, pp. 72-79.

Shreyas, et al., "Event Information Extraction From E-Mail And Updating Event In Calendar", In International Journal of Advance Research And Innovative Ideas in Education, Jan. 2018, pp. 1242-1247.

"International Search Report & Written Opinion Issued in PCT Application No. PCT/US20/037967", dated Sep. 3, 2020, 11 Pages.

* cited by examiner

RESOLVING TEMPORAL AMBIGUITIES IN NATURAL LANGUAGE INPUTS LEVERAGING SYNTAX TREE PERMUTATIONS

BACKGROUND

Digital assistants have become integrated with many parts of personal and business tasks. Users have become accustomed to utilizing digital assistants for obtaining directions, checking the weather, and initiating real-time communications with other persons (e.g., finding a contact to call, initiating a phone or video call). As digital assistants have been given access to email functions, calendar applications, and contact lists, users have started to utilize their digital assistants for scheduling meetings and appointments with other users. However, the natural language semantics that users are accustomed to using in person-to-person communications frequently include ambiguities that are not readily identifiable and/or resolvable by machine processing.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for assisting with scheduling meetings via digital assistants and application of various artificial intelligence processing models. It is common practice to use implicit references in natural language temporal expressions. For example, people say "I can meet you this week or next." Generally, the isolated word, "next", would not be recognized as a time expression by a natural language processing library or model. However, given that sentence, a human would understand that there is an implicit reference to "this week" with the conjunction "or", and that "this week or next" should be interpreted as "this week or next week". In the latter example, "next week" does not appear fully as humans expect the implicit reference to be easily interpretable.

According to examples described herein, in the context of an artificial intelligence based delegated scheduling experience, ambiguous temporal components are parsed from natural language and resolved such that a determination of a time range that users are referring to may be made. Aspects described herein provide mechanisms for intelligently identifying logical syntax tree permutations generated from ambiguous temporal components of natural language inputs, which on resolution, generate unambiguous temporal ranges. In examples, these models produce a probability distribution over possible syntax trees. The examples described herein provide for detection of complex utterances (e.g., utterances with conjunctions), parsing of logical entities and formation of relevant syntax trees, and ranking of syntax trees through the application of trained machine learning models.

BRIEF DESCRIPTION OF THE DRAWINGS

Non-limiting and non-exhaustive examples are described with reference to the following figures.

DETAILED DESCRIPTION

Figure 1:
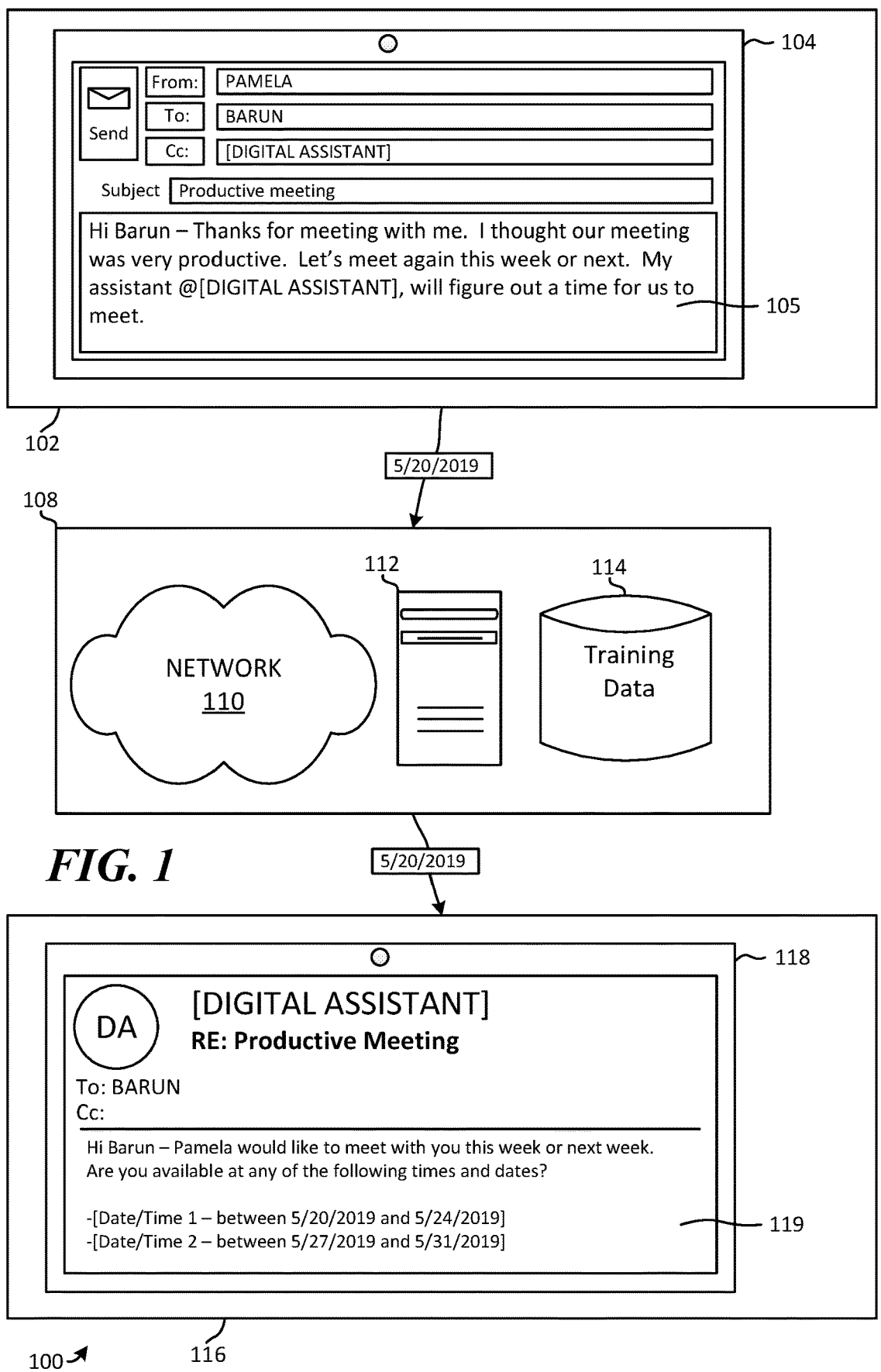
FIG. 1 is a schematic diagram illustrating an example distributed computing environment for intelligently processing a meeting request with a temporal ambiguity to surface relevant meeting times.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Examples of the disclosure provide systems, methods, and devices for utilizing artificial intelligence in association with digital assistants to process natural language inputs associated with events to identify temporal intent from language ambiguities. A natural language input may be received by a digital assistant service. The digital assistant service may receive the natural language input based on the natural language input being included in a message that has the digital assistant service included in a carbon copy field, that otherwise references the digital assistant service (e.g., in the body of a message, marked as including the digital assistant service), or in examples in which privacy settings have provided a digital assistant service with access to review all or a subset of messages from an application associated with the digital assistant service.

The digital assistant service may receive the natural language input and apply one or more natural language processing models to it that have been trained to identify whether there is a meeting intent associated with the message. If a meeting intent is determined to be present in the natural language input, the digital assistant service may make a determination as to whether the natural language input includes a temporal component. The digital assistant service may also determine whether the natural language input includes a processing initiation conjunction that separates a first temporal component meeting block alternative and a second temporal meeting block alternative. The digital assistant service may determine whether there is a temporal ambiguity in the temporal component of the natural language input. If a temporal ambiguity exists, the digital assistant service may tag each word in the temporal component. The digital assistant service may tag words as temporal expressions, temporal ranges, operators, and conjunctions.

The digital assistant service may utilize the tags to generate a plurality of syntax trees from the temporal component. In some examples the syntax trees may be abstract syntax trees. In other examples the syntax trees may be concrete syntax trees. The digital assistant service may identify syntax tree permutations for generation based on application of one or more trained models. For example, data sets of manually tagged natural language inputs that contain temporal components may be utilized to train a model to identify permutations that have a relatively high likelihood of being accurate for a given input and/or similar inputs. In some examples, only permutations that have been determined to be above a threshold likelihood of accurately identifying temporal intent for a corresponding natural language input may be generated. In other examples, the number of permutations that are generated may be dictated according to the capabilities of one or more computing devices that are generating the syntax tree permutations. For example, if a determination is made that a computing device has relatively higher processing capabilities, the threshold may be reduced, resulting in a higher number of permutations being generated. Similarly, if a determination is made that a computing device has relatively lower processing capabilities, the threshold may be made higher, resulting in a lower number of permutations being generated.

According to examples, the digital assistant service may apply one or more machine learning models to the generated syntax tree permutations. The one or more machine learning models may be trained to generate a score for each permutation corresponding to a likelihood that the permutation accurately identifies a temporal intent for a corresponding temporal component of a natural language input. The digital assistant service may rank the generated syntax tree permutations based on the generated scores. The digital assistant service may surface a highest ranked permutation. In surfacing the highest ranked syntax tree permutation (dates/times corresponding to the permutation) the digital assistant service may send an electronic message (e.g., an email) with one or more dates/times included in the message corresponding to dates/times of the highest ranked syntax tree permutation.

The systems, methods, and devices described herein provide technical advantages for scheduling meetings electronically. Processing costs (i.e., CPU cycles) associated with generating electronic messages to users for clarification regarding their temporal intent in natural language meeting commands are reduced. For example, previously if a digital assistant received a meeting command with an ambiguous temporal component, it would either ignore the ambiguous portion or generate a follow-up message that would need to be responded to for the request to be accurately processed. Processing costs are also reduced by minimizing a number of messages between users that must be generated and sent to schedule meetings. These savings are compounded as the number of meeting invitees increases (e.g., each user does not have to open a calendar application, review for free meeting times, and draft/send availability messages).

FIG. 1 is a schematic diagram illustrating an example distributed computing environment 100 for intelligently processing a meeting request with a temporal ambiguity to surface relevant meeting times. Computing environment 100 includes meeting request sub-environment 102, network and processing sub-environment 108, and meeting suggestions sub-environment 116.

Meeting request sub-environment 102 includes computing device 104, which displays an email application user interface. Specifically, the email application user interface displays a composed email 105 from "Pamela" to "Barun", with a Cc to "[DIGITAL ASSISTANT]". The subject of the email is "Productive meeting" and the body of email 105 states: "Hi Barun—Thanks for meeting with me. I thought our meeting was very productive. Let's meet again this week or next. My assistant@[DIGIT ASSISTANT], will figure out a time for us to meet." Email 105 was sent on May 20, 2019.

Once email 105 is sent, that message is routed to network and processing sub-environment 108, and in particular, a digital assistant service associated with network and processing sub-environment 108. Email 105 may be directed to the digital assistant service based on the digital assistant being included in the carbon copy field of email 105 and/or email 105 including the "@[DIGITAL ASSISTANT]" tag in its body. The digital assistant service may be at least partially cloud-based, and operate on one or more server computing devices, such as server computing device 112. Email 105 may be routed to the digital assistant service via network 110, and any of the computing devices described in relation to FIG. 1 may communicate with one another via network 110. In some examples, the digital assistant service may communicate with one or more data stores, such as training data store 114, which may include natural language data sets for training various aspects of a digital assistant. In examples, the natural language data sets in training data store 114 may have been manually tagged for training one or more natural language processing and/or machine learning models described herein.

In this example, the digital assistant service receives the entirety of email 105, including the addressees (in this case "Barun" in the "to" field, and itself [DIGITAL ASSISTANT] in the "Cc" field), the subject line "Productive meeting", and the text in the body of the email. Although not shown, in examples where the digital assistant service receives an electronic message with other tags, such as time zones, places, meeting types, etc., the digital assistant may also receive and process that information. In some examples, the digital assistant service may analyze received email 105 and determine whether there is a specific command in the that message that it should respond to (e.g., "schedule meeting", "add to my calendar", etc.). In this example, there is no direct command. However, the digital assistant service may process the text with a natural language processing engine (e.g., via application of one or more semantic parsing models) and determine that the text "My assistant@[DIGITAL ASSISTANT], will figure out a time to meet" is a command to schedule a meeting between the sender and receiver of email 105 based on information in email 105.

Upon making the determination that there is a schedule meeting intent in email 105, the digital assistant service may further process email 105 to determine whether it includes a temporal component (e.g., a time, a date) corresponding to one or more temporal windows/times the sending user would like to have a meeting scheduled. The digital assistant service may apply one or more natural language processing models to email 105 to determine whether there is a temporal component included in email 105. The one or more natural language processing models applied to email 105 to determine whether it includes a temporal component may be semantic parsing models.

In this example, the digital assistant service has made a determination that email 105 includes a temporal component. Specifically, the digital assistant service has made the determination that email 105 includes the temporal component "this week or next". Although a human user may easily identify that the temporal component "this week or next" has an intent associated with it to schedule a meeting for "this week" or "next week", there is an ambiguity present in the temporal component from a sematic natural language processing standpoint. Specifically, it is unclear as to what "next" refers to in that statement/temporal component.

In addition to identifying the temporal component "this week or next," the digital assistant service may identify that the temporal component includes a processing initiation conjunction that separates a first temporal component meeting block alternative and a second temporal meeting block alternative. The processing initiation conjunction may comprise one of: "and", "&", "+", "or", a comma, and a semi-colon. Thus, in this example, the digital assistant service identifies that the temporal component "this week or next" includes the processing initiation conjunction "or" that separates a first temporal component meeting block alternative "this week" from a second temporal component meeting block alternative "next". Although in this example there are only two temporal component meeting block alternatives in the temporal component, it should be understood that the mechanisms described herein may be applied to natural language inputs that include more than two temporal component meeting block alternatives in a temporal component (e.g., "Monday, Tuesday, or Wednesday"; "Wednesday, or next Tuesday or Thursday").

In some examples, the digital assistant service may tag each word in the identified temporal component as one of: a processing initiation conjunction; an operator; a temporal range; or a temporal expression. As described above, the processing initiation conjunction may comprise one of: "and", "&", "+", "or", a comma, and a semi-colon. Operators comprise a modifier of a temporal range or temporal expression. Exemplary operators comprise: "every", "this", "next", "any", and "following". Temporal ranges comprise words indicative of a potential scheduling temporal window. Exemplary temporal ranges comprise: "year", "month", "week", "hour", "day", "morning", "afternoon", "evening", and "night". Temporal expressions comprise specific temporal values. Exemplary temporal expressions comprise: a specific day of a week (e.g., Monday, Tuesday, Wednesday), a specific month (e.g., January, February, March), a specific season (spring, summer, fall), and a specific year (2019, 2020, 2021).

The digital assistant service may identify a temporal ambiguity in one of the temporal meeting block alternatives. The temporal ambiguity may relate to an operator needed to ground at least one of: a temporal range in the first temporal meeting block alternative, and a temporal expression in the first temporal meeting block alternative. Thus, in email 105, the temporal ambiguity relates to the second "next" in the phrase "this week or next". That is, the operator "next" (the second "next") needs a temporal range or temporal expression, which is missing from email 105. Similarly, for a phrase such as "this Monday or Tuesday", the temporal expression "Tuesday" needs an operator to ground it (e.g., "NEXT Tuesday", "THIS Tuesday", "FOLLOWING Tuesday").

In resolving the temporal ambiguity related to the operator needed to ground a temporal range or a temporal expression, the digital assistant service may generate a plurality of tree permutations for the temporal meeting block alternative that includes the ambiguity. In the example of email 105, the digital assistant service may generate a plurality of tree permutations for the second "next" in the phrase "this week or next". In some examples, the tree permutations may be syntax trees. In additional examples the tree permutations may be abstract syntax tress. In still additional examples, the tree permutations may be concrete syntax trees. Each of the plurality of tree permutations are generated such that they differ by at least one of: an operator, a temporal range, and an expression.

The training data sets (e.g., training data from training data store 114) may be utilized by the digital assistant service to reduce a number of permutations that are generated for a given temporal meeting block alternative. For example, manually tagged temporal components for same or similar ambiguities and/or natural language inputs may be identified in the training data sets, and the digital assistant service may only generate tree permutations utilizing the words that have been positively identified as correct for those temporal components, or utilizing the words that have been positively identified as correct for a threshold percentage, ratio and/or number of those temporal components. In some examples, the number of permutations that are generated may be determined based on the processing resources of one or more computing devices performing the permutation generation (e.g., the threshold percentage may be adjusted downward if the processing resources are relatively higher, and the threshold percentage may be adjusted upward in the processing resources are relatively lower).

The digital assistant service may apply one or more machine learning models that have been trained to identify a most relevant permutation for a given natural language input. In some examples, the one or more machine learning models may be supervised machine learning models. The machine learning models may be trained via one or more manually tagged data sets, such as data sets in training data store 114. For example, users may have been provided with natural language inputs (e.g., entire emails, sentences, temporal components) that include temporal ambiguities and tagged correct permutations for those natural language inputs. In other examples, users may have been provided with natural language inputs that include temporal ambiguities and tagged correct dates, times, and/or temporal ranges for those sentences and/or sentence portions. The correct permutations may thus be identified based on the correct dates, times, and/or temporal ranges in relation to a time that the training natural language inputs were sent. For example, if a training natural language input includes the phrase "this week or next", was tagged as being sent on Aug. 26, 2019, and a user tagged that natural language input as having the correct temporal range ambiguity of Sep. 2 to Sep. 6, 2019, a determination may be made that a correct permutation for that natural language input is "next week" rather than "next day" or "next hour".

Upon identifying a most relevant permutation for a given input, the digital assistant service may surface at least one temporal meeting block alternative corresponding to that permutation. In some examples, the temporal meeting block alternative corresponding to the most relevant permutation may be surfaced in an electronic message sent from the digital assistant to a meeting invitee. Thus, in the illustrated example, the digital assistant has sent email 119 displayed on computing device 118 to "Barun". Email 119 states: "Hi Barun—Pamela would like to meet with you this week or next week. Are you available at any of the following times and dates?—[Date/Time 1—between May 20, 2019 and May 24, 2019]—[Date/Time 2—between May 27, 2019 and May 31, 2019]". In some examples, the digital assistant service may have access to one or more users' calendars associated with a meeting invite and surface relevant times within identified time ranges corresponding to a natural language input and/or most relevant permutation. Other mechanisms for surfacing temporal meeting block alternatives corresponding to most relevant permutations are contemplated (e.g., pop-up window, notification, etc.).

Figure 2:
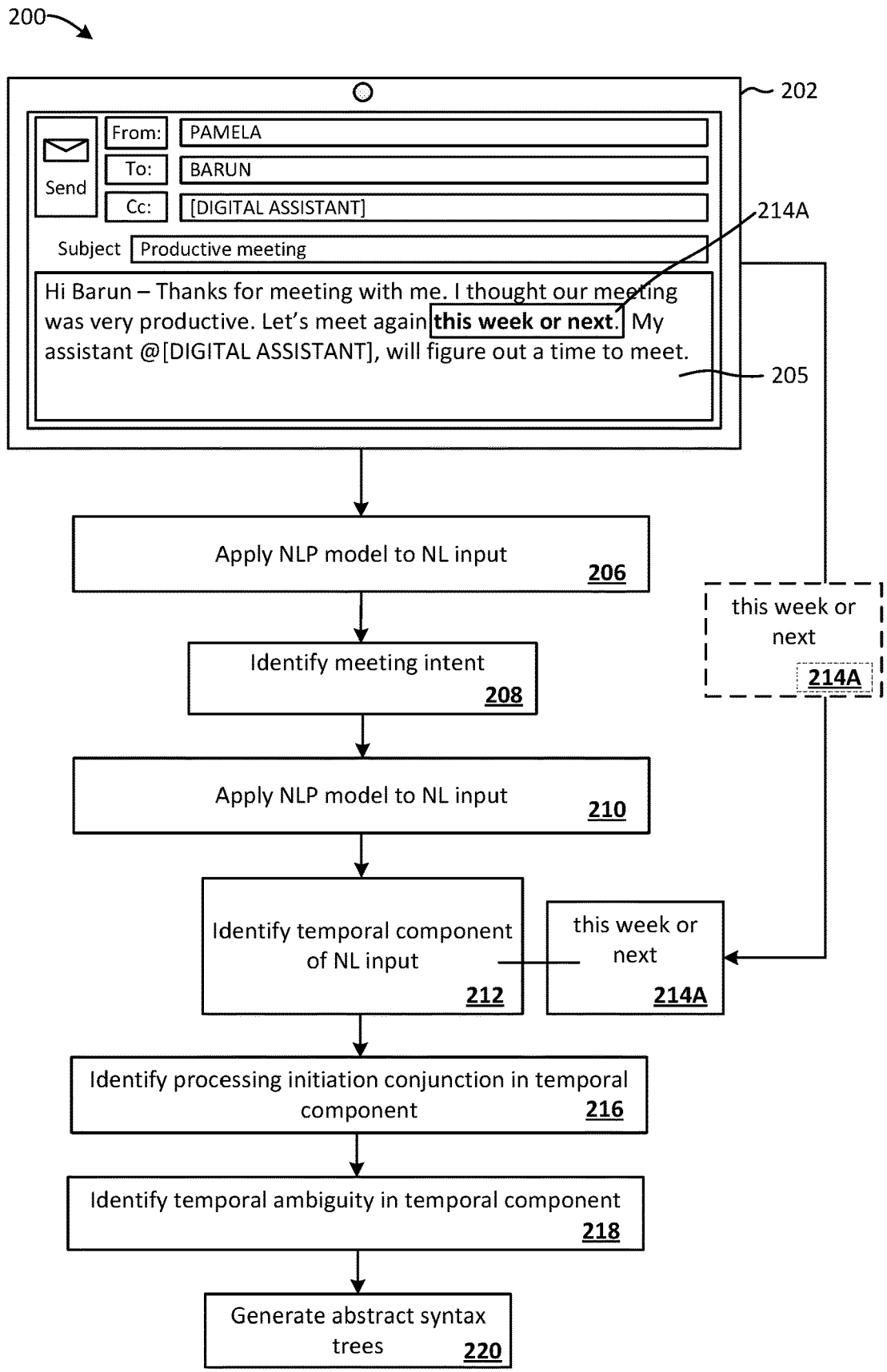
FIG. 2 is a schematic diagram illustrating the processing of a natural language input from an electronic message by a digital assistant service to assist with scheduling a meeting.

FIG. 2 is a schematic diagram 200 illustrating the processing of a natural language input from an electronic message by a digital assistant service to assist with scheduling a meeting. Schematic diagram 200 includes computing device 202 which displays email 205, and a plurality of process elements. Email 205 is the same email as email 105 discussed above in relation to FIG. 1. Specifically, the email application user interface displayed on computing device 202 includes a composed email 205 from "Pamela" to "Barun", with a Cc to "[DIGITAL ASSISTANT]". The subject of the email is "Productive meeting" and the body of email 205 states: "Hi Barun—Thanks for meeting with me. I thought our meeting was very productive. Let's meet again this week or next. My assistant@[DIGIT ASSISTANT], will figure out a time for us to meet." Email 205 was sent on May 20, 2019.

In examples, the digital assistant service may receive email 205 based on being included in the carbon copy field and/or based on being included in the body of email 205. In other examples, a user may provide the digital assistant service with access to each email that is sent from the user's account (e.g., via privacy settings).

At process element 206 the digital assistant service applies one or more natural language processing models to email 205 to determine whether there is an intent associated with email 205.

At process element 208 the digital assistant service identifies that there is a meeting intent associated with email 205. That is, the digital assistant service identifies that email 205 has an intent associated with it for the digital assistant service to assist in scheduling a meeting.

At process element 210 one or more natural language processing models are applied to the natural language input. In some examples, the one or more natural language models applied at process element 206 and process element 210 may be same natural language processing models. In other examples, the one or more natural language processing models applied at process element 206 and process element 210 may be different natural language processing models. The one or more natural language processing models applied at process element 210 may be applied to identify a temporal component of email 205.

In this example, the digital assistant service identifies temporal component 214A in email 205. Temporal component 214A is "this week or next".

At process element 216 the digital assistant service identifies the processing initiation conjunction "or" in temporal component 214A.

At process element 218 the digital assistant service identifies that there is a temporal ambiguity in temporal component 214A. Specifically, the digital assistant service identifies that the second "next" does not ground a temporal expression or temporal range in temporal component 214A.

At process element 220 the digital assistant service generates a plurality of syntax trees for the temporal meeting block alternative corresponding to the identified temporal ambiguity. Additional details related to the generation and processing of the syntax trees for the temporal meeting block alternative corresponding to the identified temporal ambiguity are provided in relation to FIG. 3 and FIG. 4.

Figure 3:
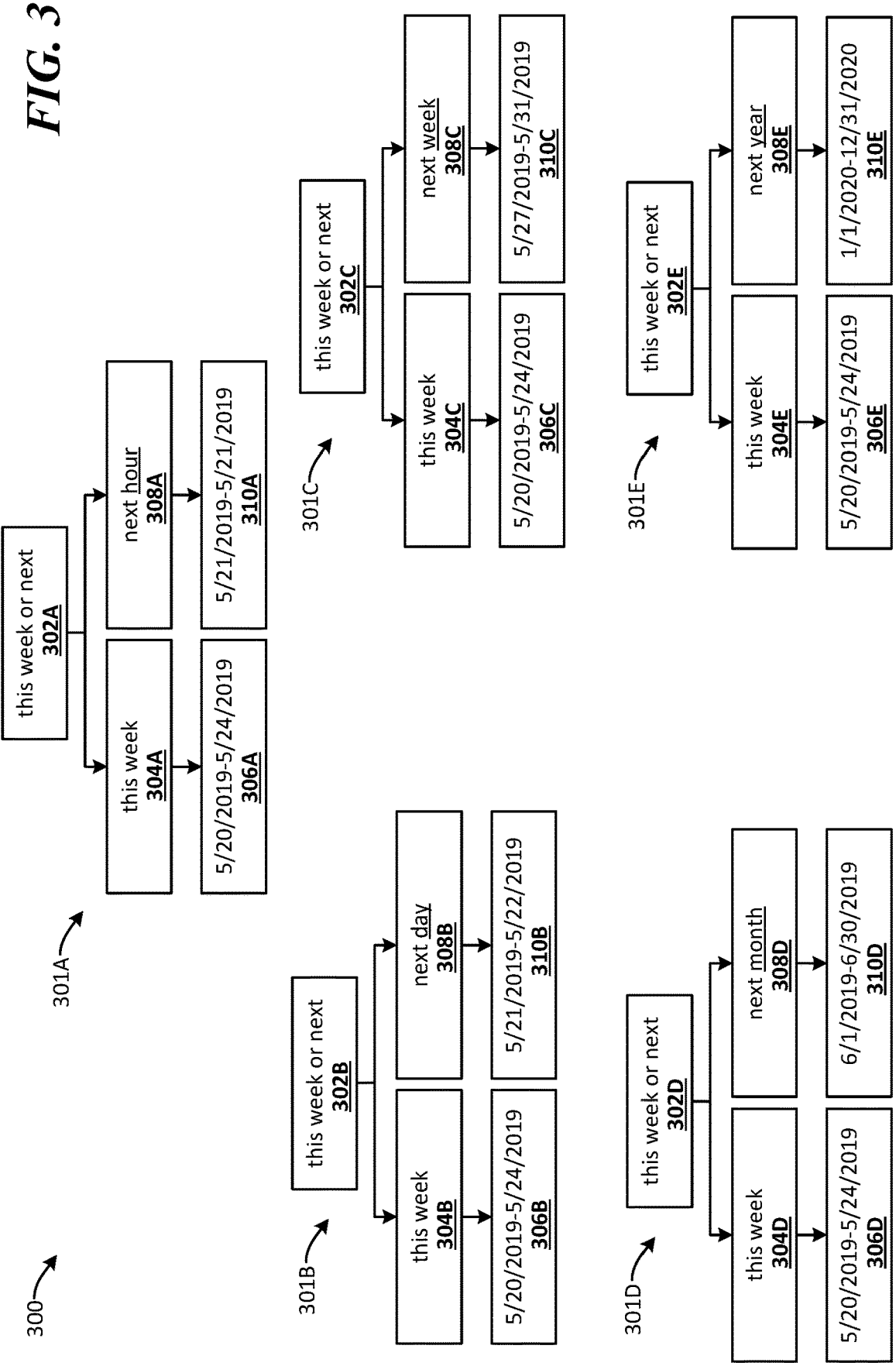
FIG. 3 is a schematic diagram illustrating syntax trees that have been generated from an ambiguous temporal component of a natural language input.

FIG. 3 is a schematic diagram 300 illustrating syntax trees that have been generated from an ambiguous temporal component of a natural language input. Specifically, the syntax trees that have been generated and that are illustrated in schematic diagram 300 correspond to the temporal meeting block alternative corresponding to the identified temporal ambiguity discussed above in relation to FIG. 1 and FIG. 2 (i.e., the second "next" in "this week or next"). It should be understood that the permutations illustrated and described in relation to schematic diagram 300 correspond to generation of permutations for a work-type calendar system (e.g., typical Monday through Friday work schedule) and that a personal-type calendar system or irregular work-type calendar system may result in different permutations and date ranges. For example, Saturdays and Sundays may be included in the date ranges for a personal-type calendar system or irregular work-type calendar system.

First syntax tree 301A includes root 302A "this week or next" with first branch 304A corresponding to the definite temporal meeting block alternative "this week". First leaf 306A stems from first branch 304A and includes a date range May 20, 2019-May 24, 2019 corresponding to the temporal meeting block alternative "this week" in first branch 304A. That is, the digital assistant service has determined based on the date that the email was sent (May 20, 2019) and the definite temporal meeting block alternative "this week", that the dates May 20, 2019-May 24, 2019 correspond to the operator and temporal range of first branch 304A (i.e., potential future meeting times in that range).

First syntax tree 301 also includes second branch 308A corresponding to the ambiguous temporal meeting block alternative and operator "next". In this example, the temporal range "hour" has been included in second branch 308A (i.e., "next hour"). Second leaf 310A stems from second branch 308A and includes a date range May 21, 2019-May 21, 2019 corresponding to the temporal meeting block alternative "next hour" in second branch 208A. That is, the digital assistant service has made a determination based on the date that the email was sent (May 20, 2019) and the generated permutation "next hour" in second branch 308A, that only the date May 21, 2019 corresponds to the operator ("next") and temporal range ("hour") of second branch 310A.

Second syntax tree 301B includes root 302B "this week or next" with first branch 304B corresponding to the definite temporal meeting block alternative "this week". First leaf 306B stems from first branch 304B and includes a date range May 20, 2020-May 24, 2019 corresponding to the temporal meeting block alternative "this week" in first branch 304B. That is, the digital assistant service has determined based on the date that the email was sent (May 20, 2019) and the definite temporal meeting block alternative "this week", that the dates May 20, 2020-May 24, 2019 correspond to the operator and temporal range of first branch 304B.

Second syntax tree 301B also includes second branch 308B corresponding to the ambiguous temporal meeting block alternative and operator "next". In this example, the temporal range "day" has been included in second branch 308B (i.e., "next day"). Second leaf 310B stems from second branch 308B and includes a date range May 21, 2019-May 22, 2019 corresponding to the temporal meeting block alternative "next day" in second branch 208B. That is, the digital assistant service has made a determination based on the date that the email was sent (May 20, 2019) and the generated permutation "next day" in second branch 308B, that the dates May 21, 2019-May 22, 2019 correspond to the operator ("next") and temporal range ("day") of second branch 310B.

Third syntax tree 301C includes root 302C "this week or next" with first branch 304C corresponding to the definite temporal meeting block alternative "this week". First leaf 306C stems from first branch 304C and includes a date range May 20, 2019-May 24, 2019 corresponding to the temporal meeting block alternative "this week" in first branch 304C. That is, the digital assistant service has determined based on the date that the email was sent (May 20, 2019) and the definite temporal meeting block alternative "this week", that the dates May 20, 2019-May 24, 2019 correspond to the operator and temporal range of first branch 304B.

Third syntax tree 301C also includes second branch 308C corresponding to the ambiguous temporal meeting block alternative and operator "next". In this example, the temporal range "week" has been included in second branch 308C (i.e., "next week"). Second leaf 310C stems from second branch 308C and includes a date range May 27, 2019-May 31, 2019 corresponding to the temporal meeting block alternative "next week" in second branch 208C. That is, the digital assistant service has made a determination based on the date that the email was sent (May 20, 2019) and the generated permutation "next week" in second branch 308C, that the dates May 27, 2019-May 31, 2019 correspond to the operator ("next") and temporal range ("week") of second branch 310C.

Fourth syntax tree 301D includes root 302D "this week or next" with first branch 304D corresponding to the definite temporal meeting block alternative "this week". First leaf 306D stems from first branch 304D and includes a date range May 20, 2019-May 24, 2019 corresponding to the temporal meeting block alternative "this week" in first branch 304D. That is, the digital assistant service has determined based on the date that the email was sent (May 20, 2019) and the definite temporal meeting block alternative "this week", that the dates May 20, 2019-May 24, 2019 correspond to the operator and temporal range of first branch 304D.

Fourth syntax tree 301D also includes second branch 308D corresponding to the ambiguous temporal meeting block alternative and operator "next". In this example, the temporal range "month" has been included in second branch 308D (i.e., "next month"). Second leaf 310D stems from second branch 308D and includes a date range Jun. 1, 2019-Jun. 30, 2019 corresponding to the temporal meeting block alternative "next month" in second branch 208D. That is, the digital assistant service has made a determination based on the date that the email was sent (May 20, 2019) and the generated permutation "next month" in second branch 308D, that the dates Jun. 1, 2019-Jun. 30, 2019 correspond to the operator ("next") and temporal range ("month") of second branch 310D.

Fifth syntax tree 301E includes root 302E "this week or next" with first branch 304E corresponding to the definite temporal meeting block alternative "this week". First leaf 306E stems from first branch 304E and includes a date range May 20, 2019-May 24, 2019 corresponding to the temporal meeting block alternative "this week" in first branch 304E. That is, the digital assistant service has determined based on the date that the email was sent (May 20, 2019) and the definite temporal meeting block alternative "this week", that the dates May 20, 2019-May 24, 2019 correspond to the operator and temporal range of first branch 304E.

Fifth syntax tree 301E also includes second branch 308E corresponding to the ambiguous temporal meeting block alternative and operator "next". In this example, the temporal range "year" has been included in second branch 308E (i.e., "next year"). Second leaf 310E stems from second branch 308E and includes a date range Jan. 1, 2001-Dec. 31, 2020 corresponding to the temporal meeting block alternative "next year" in second branch 208E. That is, the digital assistant service has made a determination based on the date that the email was sent (May 20, 2019) and the generated permutation "next year" in second branch 308E, that the dates Jan. 1, 2020-Dec. 31, 2020 correspond to the operator ("next") and temporal range ("year") of second branch 310E.

Figure 4:
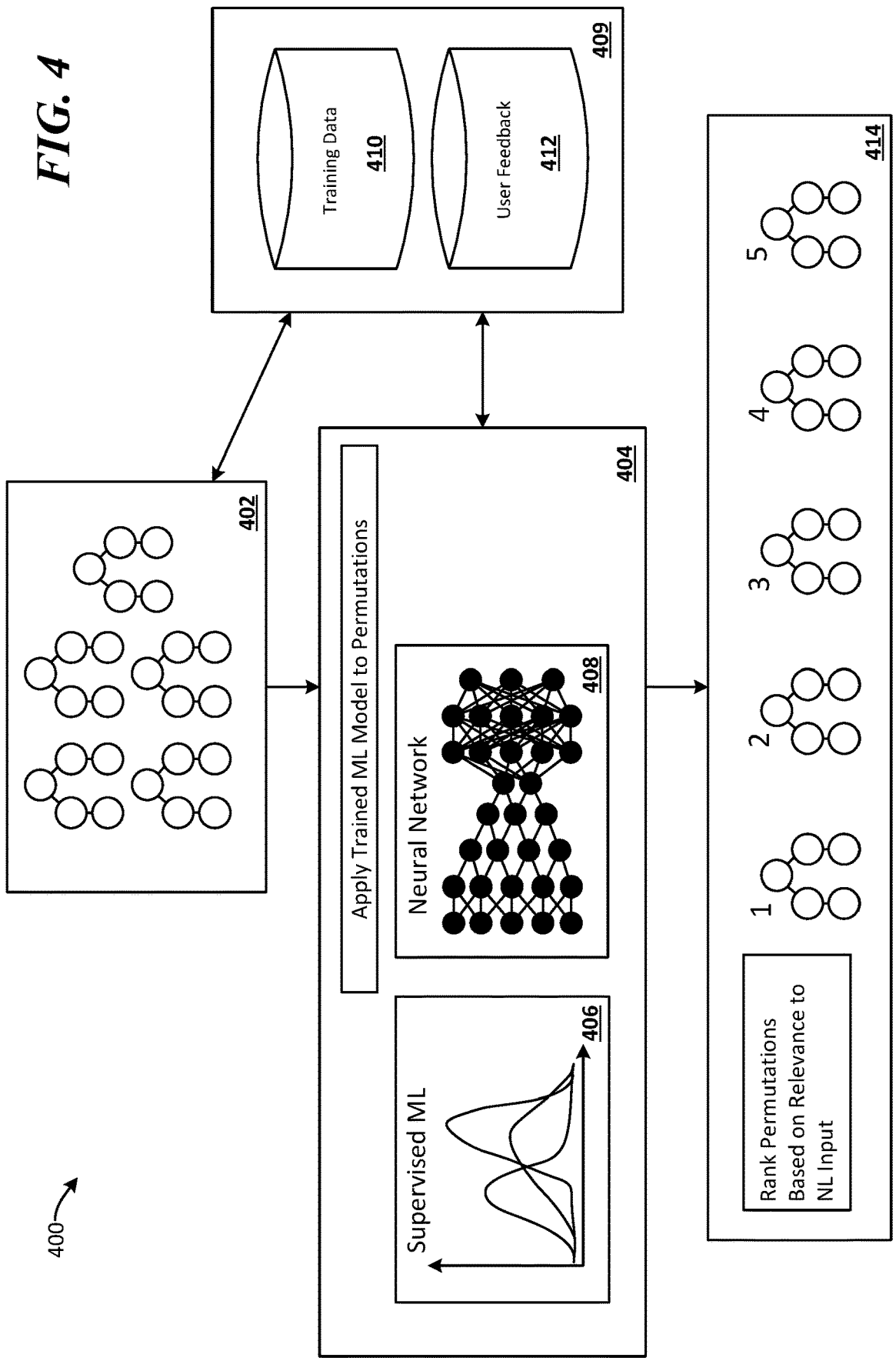
FIG. 4 is a schematic diagram illustrating an example distributed computing environment for identifying a highest ranked syntax tree for an ambiguous temporal component of a natural language input.

FIG. 4 is a schematic diagram illustrating an example distributed computing environment 400 for identifying a highest ranked syntax tree for an ambiguous temporal component of a natural language input. Computing environment 400 includes generated syntax tree sub-environment 402, scoring sub-environment 404, training sub-environment 409, and ranked permutation sub-environment 414.

Generated syntax tree sub-environment 402 includes a plurality of syntax trees that have been generated for temporal components of natural language inputs to a digital assistant service. Although there are five syntax trees illustrated as being generated in syntax tree sub-environment 402 it should be understood that more of fewer syntax trees may be generated based on the natural language input, the similarity of training data to the natural language input, the size of an applied temporal expression library, the size of an applied temporal range library, and/or the processing capabilities of one or more computing devices that generated the syntax trees.

Training sub-environment 409 includes training data storage 410 and user feedback storage 412. Training data storage 410 includes one or more natural language data sets with temporal ambiguities that have been manually classified/tagged. That is, training data storage 410 includes a plurality of natural language inputs and/or temporal components of natural language inputs that have temporal ambiguities for which one or more users have selected a correct operator, temporal range and/or temporal expression such that operators in the temporal components ground one or both of a temporal range or a temporal expression in relation to the ambiguities. Similarly, training data store 410 includes user feedback related to meeting requests that have been sent by the digital assistant service for which there were temporal ambiguities. For example, users may provide feedback to the digital assistant service when a temporal ambiguity in a natural language input has been resolved correctly by the digital assistant service, and that feedback may be stored in user feedback store 412. Similarly, users may provide feedback to the digital assistant service when a temporal ambiguity in a natural language input has been resolved incorrectly by the digital assistant service, and that feedback may be stored in user feedback store 412.

The training data in training data store 410, and the user feedback in user feedback store 412 may be utilized to train one or more machine learning models in scoring sub-environment 404. The training data in training data store 410, and the user feedback in user feedback store 412 may additionally or alternatively be used to train a syntax tree generation engine that generates the syntax trees (e.g., syntax trees in generated syntax tree sub-environment 402). For example, the user feedback and training data may be analyzed by the syntax tree generation engine to identify which combination of operators, temporal ranges and/or temporal expressions are most likely to be correct/accurate for a given temporal ambiguity in a temporal component of a natural language input. By identifying these most relevant combinations, the syntax tree generation engine may generate fewer syntax trees than would otherwise be needed to resolve a temporal ambiguity.

Scoring sub-environment 404 includes supervised machine learning model 406 and neural network 408. Neural network 408 is one example of a supervised machine learning model that may be applied to the generated syntax trees. Other machine learning models may additionally or alternatively be utilized (e.g., statistical machine learning models, clustering models, etc.). The unsupervised machine learning models in scoring sub-environment 404 illustrate that the syntax trees that are generated for a given temporal component with a temporal ambiguity may be processed by one or more machine learning models that have been trained to identify a most relevant permutation for a given natural language input. More specifically, the one or more machine learning models may be trained to generate a score for each syntax tree for a given natural language input corresponding to a likelihood that the components of that syntax tree (operator, temporal range, temporal expression) correctly/accurately resolve the temporal ambiguity in relation to user intent.

Once the syntax trees have been scored, they may be ranked based on those scores as illustrated in ranked permutation sub-environment 414.

Figure 5:
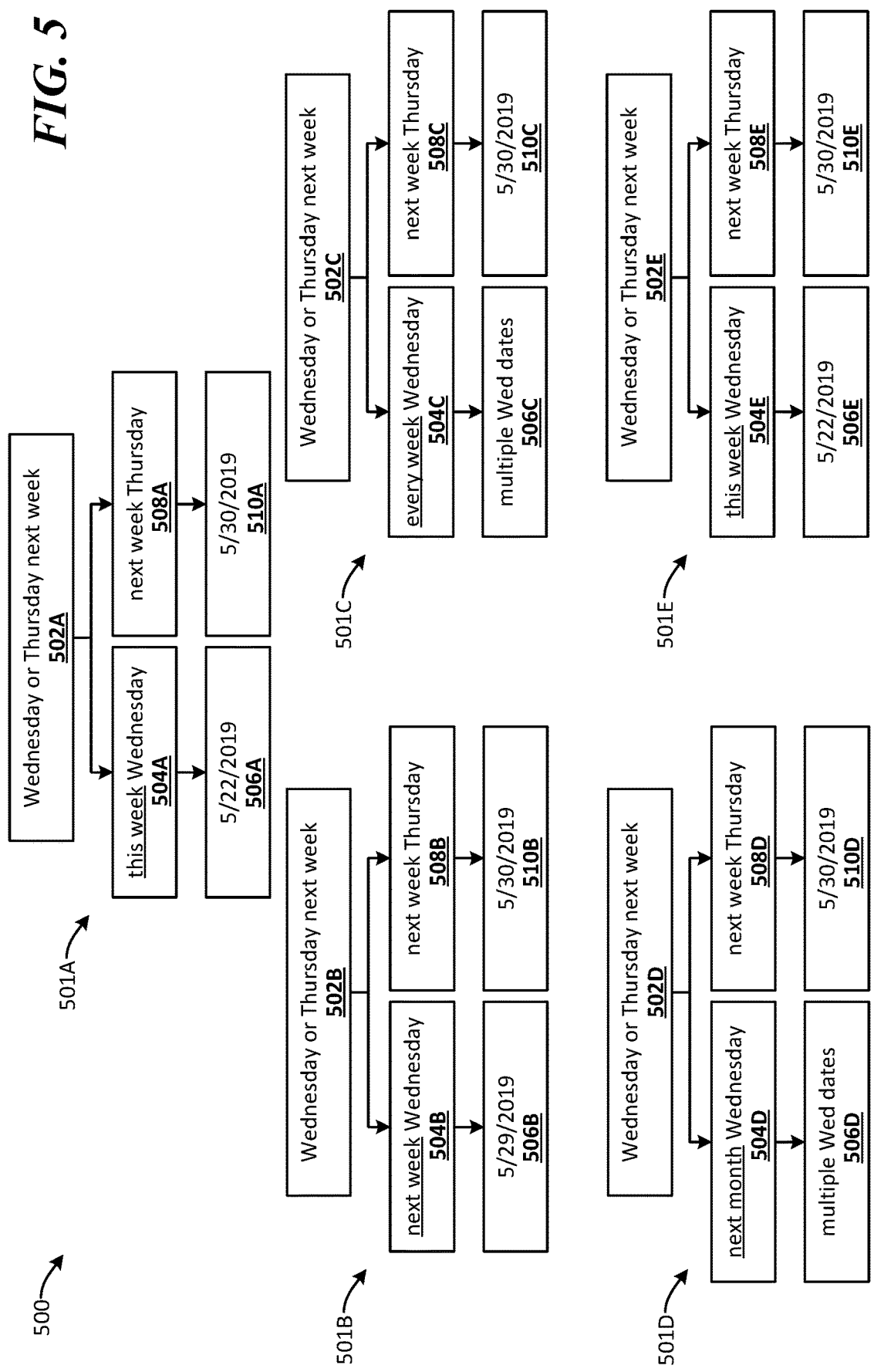
FIG. 5 is another schematic diagram illustrating syntax trees that have been generated from an ambiguous temporal component of a natural language input.

FIG. 5 is another schematic diagram 500 illustrating syntax trees that have been generated from an ambiguous temporal component of a natural language input. The temporal component in the natural language input is "Wednesday or Thursday next week" and the natural language input was sent by a user and received by the digital assistant service on May 20, 2019. The ambiguous temporal component of the natural language input is "Wednesday" in "Wednesday or Thursday next week". That is, the temporal expression "Wednesday" in the natural language input is lacking an operator to ground it, as well as a temporal range. It should be understood that the permutations illustrated and described in relation to schematic diagram 500 correspond to generation of permutations for a work-type calendar system (e.g., typical Monday through Friday work schedule) and that a personal-type calendar system or irregular work-type calendar system may result in different results for date ranges. For example, Saturdays and Sundays may be included in the date ranges for a personal-type calendar system or irregular work-type calendar system.

First syntax tree 502A includes root 502A "Wednesday or Thursday next week" with first branch 508A corresponding to the definite temporal meeting block alternative "next week Thursday". First leaf 510A stems from first branch 508A and includes a date range (in this case a single date) of May 30, 2019 corresponding to the temporal meeting block alternative "next week Thursday" in first branch 508A. That is, the digital assistant service has determined based on the date that the natural language input was sent (May 20, 2019) and the definite temporal meeting block alternative "next week Thursday", that the date May 30, 2019 corresponds to the operator ("next"), temporal range ("week") and temporal expression ("Thursday") of first branch 508A.

First syntax tree 502A also includes second branch 504A corresponding to the ambiguous temporal meeting block alternative and temporal expression "Wednesday". In this example, the operator "this" and the temporal range "week" have been included in second branch 504A (i.e., "this week Wednesday"). Second leaf 506A stems from second branch 504A and includes a date range (in this case a single date) May 22, 2019 corresponding to the temporal meeting block alternative "this week Wednesday" in first branch 504A. That is, the digital assistant service has made a determination based on the date that the natural language input was sent (May 20, 2019) and the generated permutation "this week Wednesday" in second branch 504A, that the date May 22, 2019 corresponds to the operator ("this"), temporal range ("week") and temporal expression ("Wednesday") of second branch 504A.

Second syntax tree 502B includes root 502B "Wednesday or Thursday next week" with first branch 508B corresponding to the definite temporal meeting block alternative "next week Thursday". First leaf 510B stems from first branch 508B and includes a date range (in this case a single date) of May 30, 2019 corresponding to the temporal meeting block alternative "next week Thursday" in first branch 508B. That is, the digital assistant service has determined based on the date that the natural language input was sent (May 20, 2019) and the definite temporal meeting block alternative "next week Thursday", that the date May 30, 2019 corresponds to the operator ("next"), temporal range ("week") and temporal expression ("Thursday") of first branch 508B.

Second syntax tree 502B also includes second branch 504B corresponding to the ambiguous temporal meeting block alternative and temporal expression "Wednesday". In this example, the operator "next" and the temporal range "week" have been included in second branch 504B (i.e., "next week Wednesday"). Second leaf 506B stems from second branch 504B and includes a date range (in this case a single date) May 29, 2019 corresponding to the temporal meeting block alternative "next week Wednesday" in first branch 504B. That is, the digital assistant service has made a determination based on the date that the natural language input was sent (May 20, 2019) and the generated permutation "next week Wednesday" in second branch 504B, that the date May 29, 2019 corresponds to the operator ("next"), temporal range ("week") and temporal expression ("Wednesday") of second branch 504B.

Third syntax tree 502C includes root 502C "Wednesday or Thursday next week" with first branch 508C corresponding to the definite temporal meeting block alternative "next week Thursday". First leaf 510C stems from first branch 508C and includes a date range (in this case a single date) of May 30, 2019 corresponding to the temporal meeting block alternative "next week Thursday" in first branch 508C. That is, the digital assistant service has determined based on the date that the natural language input was sent (May 20, 2019) and the definite temporal meeting block alternative "next week Thursday", that the date May 30, 2019 corresponds to the operator ("next"), temporal range ("week") and temporal expression ("Thursday") of first branch 508C.

Third syntax tree 502C also includes second branch 504C corresponding to the ambiguous temporal meeting block alternative and temporal expression "Wednesday". In this example, the operator "every" and the temporal range "week" have been included in second branch 504C (i.e., "every week Wednesday"). Second leaf 506C stems from second branch 504C and includes dates (multiple dates corresponding to every Wednesday going forward) corresponding to the temporal meeting block alternative "every week Wednesday" in first branch 504C. That is, the digital assistant service has made a determination based on the date that the natural language input was sent (May 20, 2019) and the generated permutation "every week Wednesday" in second branch 504C, that each of the dates corresponding to every Wednesday going forward correspond to the operator ("every"), temporal range ("week") and temporal expression ("Wednesday") of second branch 504C.

Fourth syntax tree 502D includes root 502D "Wednesday or Thursday next week" with first branch 508D corresponding to the definite temporal meeting block alternative "next week Thursday". First leaf 510D stems from first branch 508D and includes a date range (in this case a single date) of May 30, 2019 corresponding to the temporal meeting block alternative "next week Thursday" in first branch 508D. That is, the digital assistant service has determined based on the date that the natural language input was sent (May 20, 2019) and the definite temporal meeting block alternative "next week Thursday", that the date May 30, 2019 corresponds to the operator ("next"), temporal range ("week") and temporal expression ("Thursday") of first branch 508D.

Fourth syntax tree 502D also includes second branch 504D corresponding to the ambiguous temporal meeting block alternative and temporal expression "Wednesday". In this example, the operator "next" and the temporal range "month" have been included in second branch 504D (i.e., "next month Wednesday"). Second leaf 506D stems from second branch 504D and includes dates (each Wednesday date in June 2019) corresponding to the temporal meeting block alternative "next month Wednesday" in first branch 504D. That is, the digital assistant service has made a determination based on the date that the natural language input was sent (May 20, 2019) and the generated permutation "next month Wednesday" in second branch 504D, that each of the dates corresponding to the Wednesdays in June 2019 correspond to the operator ("next"), temporal range ("month") and temporal expression ("Wednesday") of second branch 504D.

Fifth syntax tree 502E includes root 502E "Wednesday or Thursday next week" with first branch 508E corresponding to the definite temporal meeting block alternative "next week Thursday". First leaf 510E stems from first branch 508E and includes a date range (in this case a single date) of May 30, 2019 corresponding to the temporal meeting block alternative "next week Thursday" in first branch 508E. That is, the digital assistant service has determined based on the date that the natural language input was sent (May 20, 2019) and the definite temporal meeting block alternative "next week Thursday", that the date May 30, 2019 corresponds to the operator ("next"), temporal range ("week") and temporal expression ("Thursday") of first branch 508E.

Fifth syntax tree 502E also includes second branch 504E corresponding to the ambiguous temporal meeting block alternative and temporal expression "Wednesday". In this example, the operator "this" and the temporal range "week" have been included in second branch 504E (i.e., "this week Wednesday"). Second leaf 506E stems from second branch 504E and includes a date range (in this case a single date) May 22, 2019 corresponding to the temporal meeting block alternative "this week Wednesday" in first branch 504E. That is, the digital assistant service has made a determination based on the date that the natural language input was sent (May 20, 2019) and the generated permutation "this week Wednesday" in second branch 504E, that the date May 29, 2019 corresponds to the operator ("this"), temporal range ("week") and temporal expression ("Wednesday") of second branch 504E.

Figure 6:
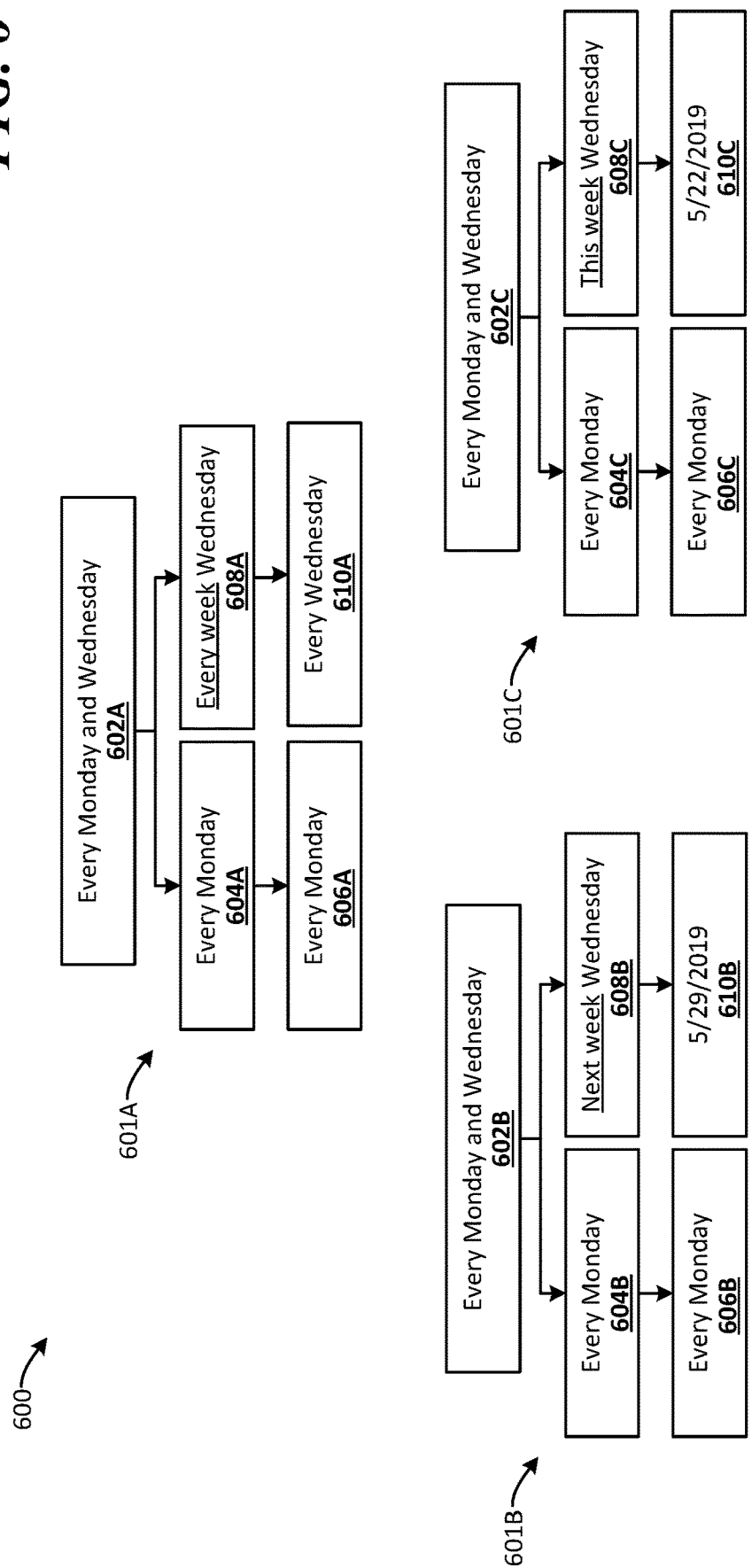
FIG. 6 is another schematic diagram illustrating syntax trees that have been generated from an ambiguous temporal component of a natural language input.

FIG. 6 is another schematic diagram 600 illustrating syntax trees that have been generated from an ambiguous temporal component of a natural language input. The temporal component in the natural language input is "Every Monday and Wednesday" and the natural language input was sent by a user and received by the digital assistant service on May 20, 2019. The ambiguous temporal component of the natural language input is "Wednesday" in "Every Monday and Wednesday". That is, the temporal expression "Wednesday" in the natural language input is lacking an operator to ground it. It should be understood that the permutations illustrated and described in relation to schematic diagram 600 correspond to generation of permutations for a work-type calendar system (e.g., typical Monday through Friday work schedule) and that a personal-type calendar system or irregular work-type calendar system may result in different results for date ranges. For example, Saturdays and Sundays may be included in the date ranges for a personal-type calendar system or irregular work-type calendar system.

First syntax tree 602A includes root 602A "Every Monday and Wednesday" with first branch 604A corresponding to the definite temporal meeting block alternative "Every Monday". First leaf 606A stems from first branch 604A and includes dates (in this case multiple dates) for each Monday going forward corresponding to the temporal meeting block alternative "Every Monday" in first branch 604A. That is, the digital assistant service has determined based on the date that the natural language input was sent (May 20, 2019) and the definite temporal meeting block alternative "Every Monday", that dates corresponding to every Monday going forward correspond to the operator ("every") and temporal expression ("Monday") of first branch 604A. In this example, the temporal range "week" is not illustrated as being included in first branch 604A-604C, although it may be included during the generation of each of the syntax trees described in FIG. 6.

First syntax tree 602A also includes second branch 608A corresponding to the ambiguous temporal meeting block alternative and temporal expression "Wednesday". In this example, the operator "Every", and the temporal range "week" have been included in second branch 608A (i.e., "Every week Wednesday"). Second leaf 610A stems from second branch 608A and includes dates (in this case multiple dates) for each Wednesday going forward corresponding to the temporal meeting block alternative "Every week Wednesday" in second branch 608A. That is, the digital assistant service has made a determination based on the date that the natural language input was sent (May 20, 2019) and the generated permutation "Every week Wednesday" in second branch 608A, that dates corresponding to every week Wednesday going forward correspond to the operator ("Every"), the temporal range ("week"), and the temporal expression ("Wednesday") of second branch 610A.

Second syntax tree 602B includes root 602B "Every Monday and Wednesday" with first branch 604B corresponding to the definite temporal meeting block alternative "Every Monday". First leaf 606B stems from first branch 604B and includes dates (in this case multiple dates) for each Monday going forward corresponding to the temporal meeting block alternative "Every Monday" in first branch 604B. That is, the digital assistant service has determined based on the date that the natural language input was sent (May 20, 2019) and the definite temporal meeting block alternative "Every Monday", that dates corresponding to every Monday going forward correspond to the operator ("every") and temporal expression ("Monday") of first branch 604B.

Second syntax tree 602B also includes second branch 608B corresponding to the ambiguous temporal meeting block alternative and temporal expression "Wednesday". In this example, the operator "Next" and the temporal range "week" have been included in second branch 608B (i.e., "Next week Wednesday"). Second leaf 610B stems from second branch 608B and includes a date (May 29, 2019) corresponding to the temporal meeting block alternative "Next week Wednesday" in second branch 608B. That is, the digital assistant service has made a determination based on the date that the natural language input was sent (May 20, 2019) and the generated permutation "Next week Wednesday" in second branch 608B, that the date May 29, 2019 corresponds to the operator ("Next"), the temporal range ("week") and temporal expression ("Wednesday") of second branch 608B.

Third syntax tree 602C includes root 602C "Every Monday and Wednesday" with first branch 604C corresponding to the definite temporal meeting block alternative "Every Monday". First leaf 606C stems from first branch 604C and includes dates (in this case multiple dates) for each Monday going forward corresponding to the temporal meeting block alternative "Every Monday" in first branch 604C. That is, the digital assistant service has determined based on the date that the natural language input was sent (May 20, 2019) and the definite temporal meeting block alternative "Every Monday", that dates corresponding to every Monday going forward correspond to the operator ("every") and temporal expression ("Monday") of first branch 604C.

Third syntax tree 602C also includes second branch 608C corresponding to the ambiguous temporal meeting block alternative and temporal expression "Wednesday". In this example, the operator "This" and the temporal range "week" have been included in second branch 608C (i.e., "This week Wednesday"). Second leaf 610C stems from second branch 608C and includes a date (May 22, 2019) corresponding to the temporal meeting block alternative "This week Wednesday" in second branch 608C. That is, the digital assistant service has made a determination based on the date that the natural language input was sent (May 20, 2019) and the generated permutation "This week Wednesday" in second branch 608C, that the date May 22, 2019 corresponds to the operator ("This"), the temporal range ("week") and temporal expression ("Wednesday") of second branch 608C.

Figure 7:
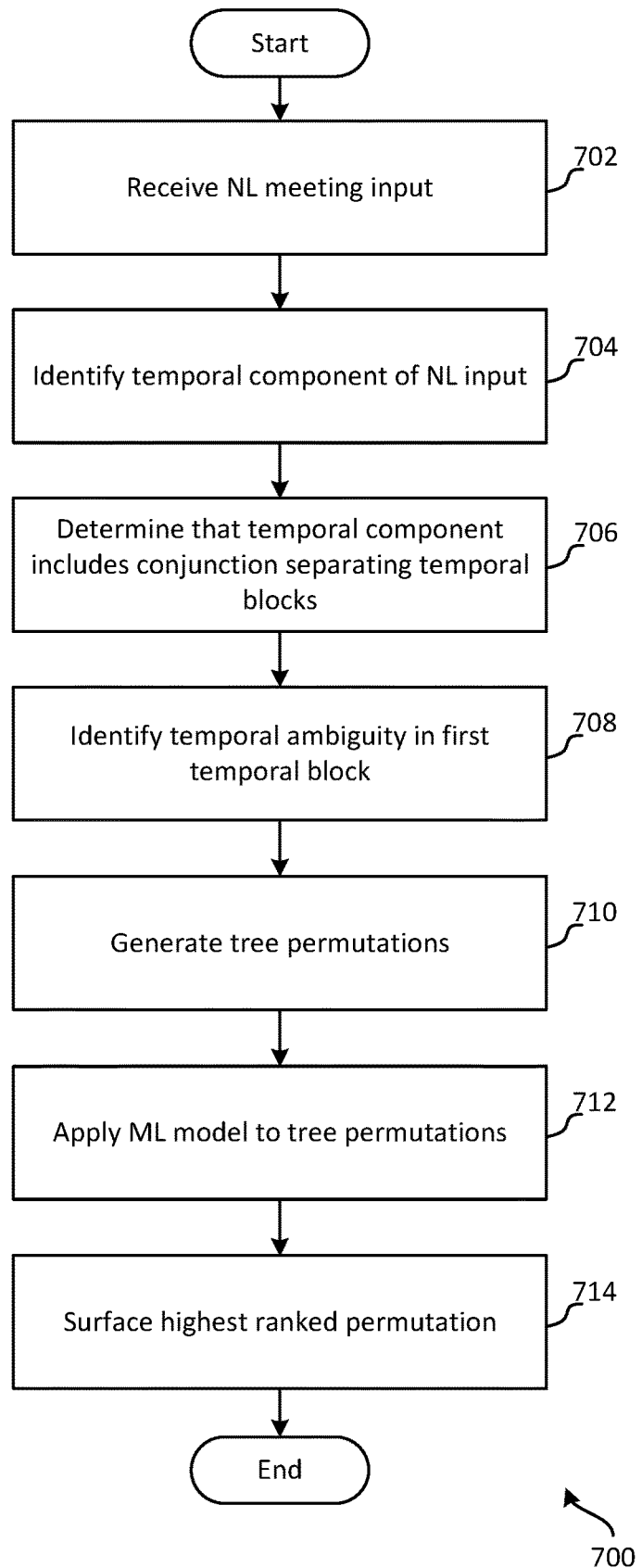
FIG. 7 is an exemplary method for assisting with resolving temporal ambiguities in natural language.

FIG. 7 is an exemplary method 700 for assisting with resolving temporal ambiguities in natural language. The method 700 begins at a start operation and flow moves to operation 702.

At operation 702 a natural language input comprising an electronic meeting request is received. The natural language input may be received in the form of an email, a text message, and a verbal input, for example. In examples, the natural language input may be received by a digital assistant service. The natural language input may be directed to the digital assistant service based on the digital assistant being included in the body of a message and/or as one of the recipients of a message. In some examples, the digital assistant service may be granted with access to all messages sent from a user account based on a customizable privacy setting.

From operation 702 flow continues to operation 704 where a temporal component of the natural language input is identified. The temporal component may be identified via application of one or more natural language processing models. In some examples, the one or more natural language processing models may comprise semantic parsing models.

From operation 704 flow continues to operation 706 where a determination is made that the temporal component includes a processing initiation conjunction that separates a first temporal meeting block alternative and a second temporal meeting block alternative. In examples, the processing initiation conjunction may comprise one of: the word "and", the ampersand character, the plus character, the word "or", a comma, and a semi-colon.

From operation 706 flow continues to operation 708 where a temporal ambiguity in the first temporal meeting block alternative is identified. The temporal ambiguity may relate to an operator needed to ground at least one of: a temporal range in the first temporal meeting block alternative, and a temporal expression in the first temporal meeting block alternative. The operator may comprise a modifier of the temporal range of the temporal expression, including the words "every", "this", "next", "any", and "following". The temporal range may comprise one of the words: "year", "month", "week", "day", "hour", "morning", "afternoon", "evening", and "night". The temporal expression may comprise one of the words "Sunday", "Monday", "Tuesday", "Wednesday", "Thursday", "Friday", "Saturday", "January", "February", "March", "April", "May", "June", "July", "August", "September", "October", "November", and "December", "winter", "spring", "summer", and "fall". The digital assistants service may maintain one or more libraries for the operators, temporal ranges, temporal expressions and/or processing initiation conjunctions. As such, there may be more of fewer words and/or symbols corresponding to those elements for a digital assistant service to resolve ambiguities with.

From operation 708 flow continues to operation 710 where a plurality of tree permutations for the first temporal meeting block alternative are generated. According to examples, each of the permutations may differ from at least one other permutation by at least one of: an operator, a temporal range, and a temporal expression.

From operation 710 flow continues to operation 712 where a machine learning model that has been trained to identify a most relevant permutation for a given natural language input is applied to each of the plurality of tree permutations. The machine learning model may calculate a relevance score corresponding to each of the plurality of tree permutations' relevance to the natural language input.

From operation 712 flow continues to operation 714 where a temporal meeting block alternative corresponding to the most relevant permutation for the natural language input is surfaced. In examples, the most relevant permutation for the natural language input is surfaced in an electronic message from a digital assistant (e.g., via an email from a digital assistant, via a direct message from a digital assistant). In some examples, the electronic message may be a meeting invite sent to a meeting invitee associated with the natural language input.

From operation 714 flow continues to an end operation and the method 700 ends.

Figure 8:
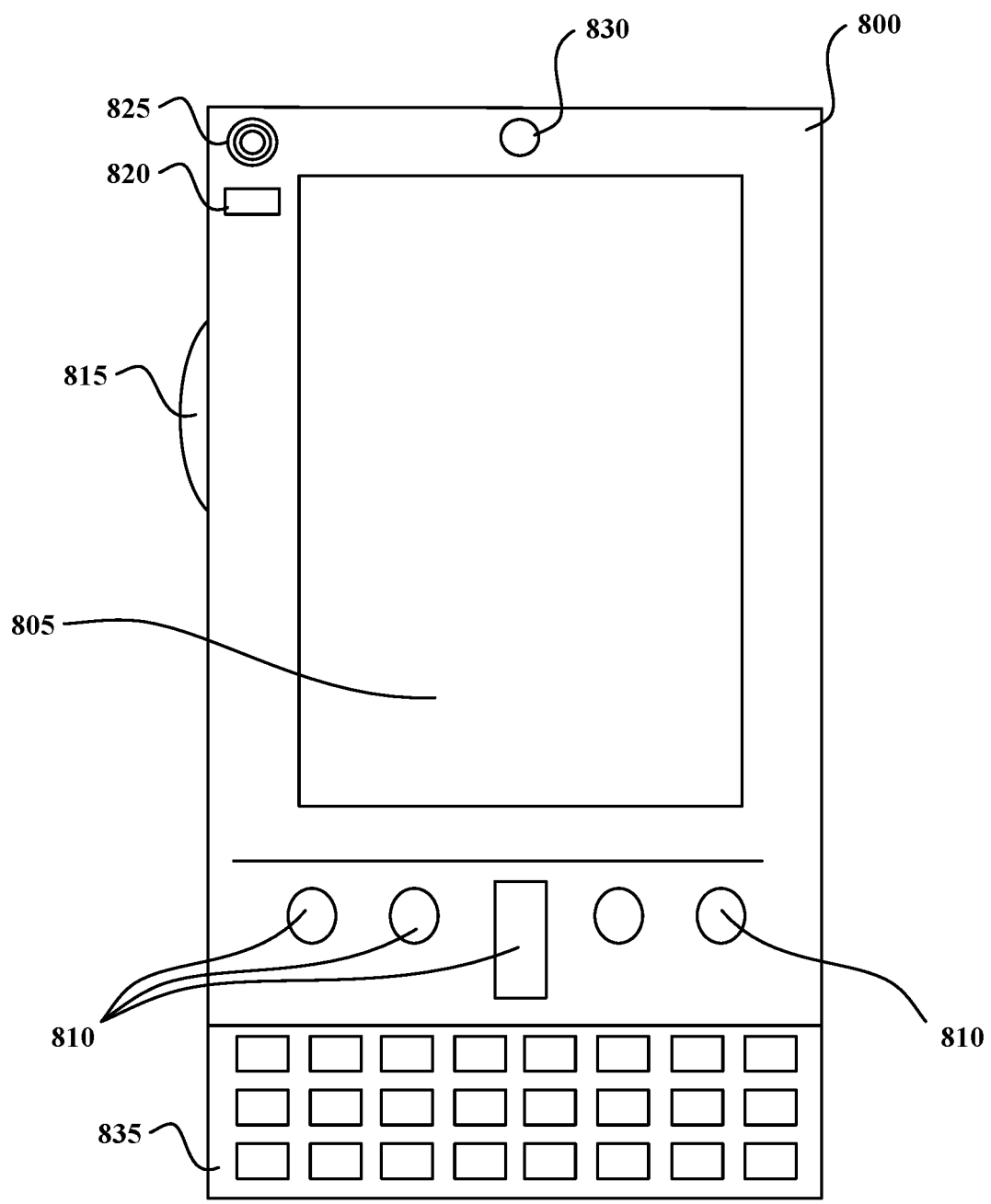
FIGS. 8 and 9 are simplified diagrams of a mobile computing device with which aspects of the disclosure may be practiced.
Figure 9:
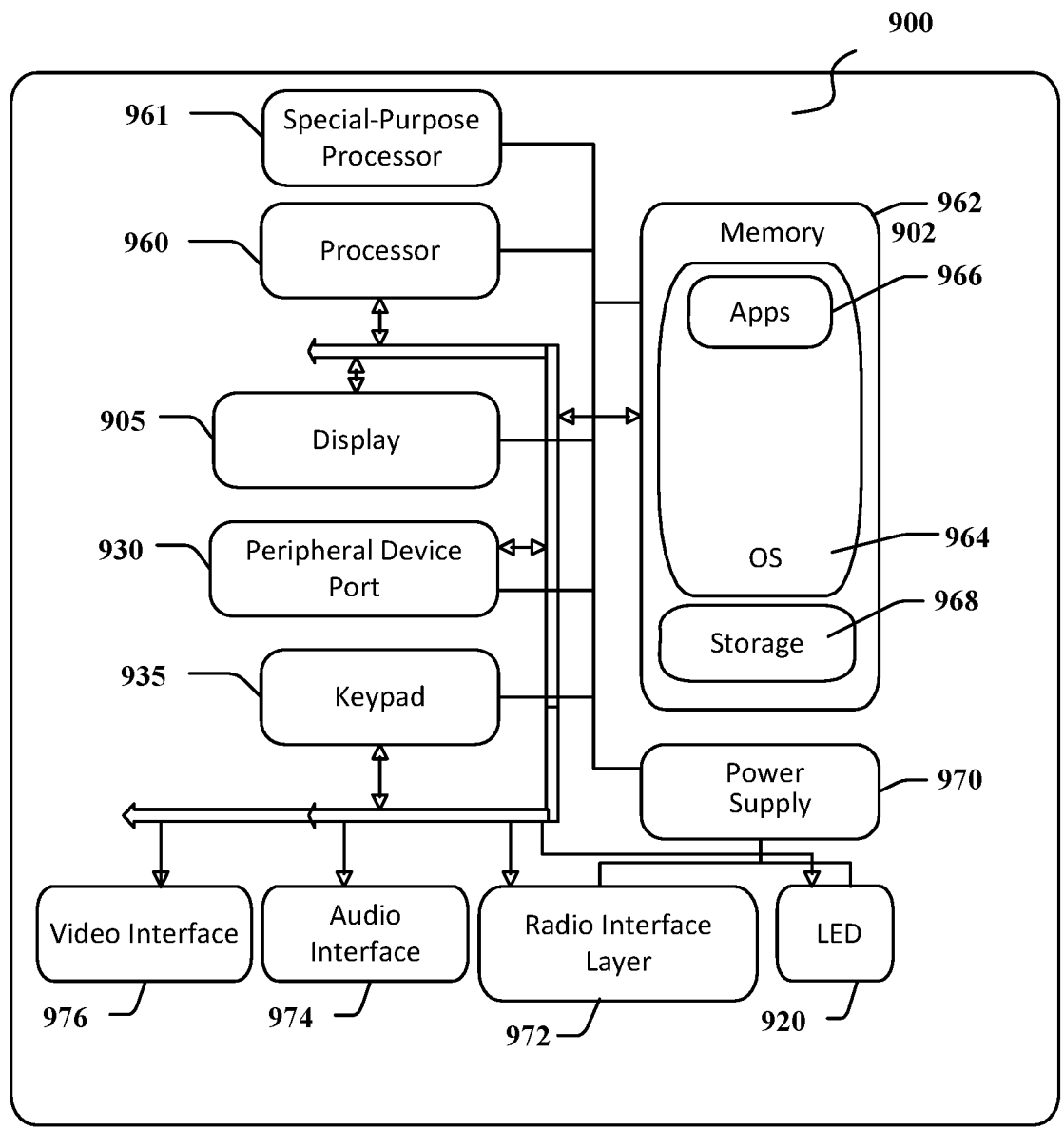

FIGS. 8 and 9 illustrate a mobile computing device 800, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 8, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative aspects, mobile computing device 800 may incorporate more or fewer input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 9 is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900, including instructions for providing and operating a digital assistant and/or calendar application.

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 820 may be used to provide visual notifications, and/or an audio interface 974 may be used for producing audible notifications via the audio transducer 825. In the illustrated embodiment, the visual indicator 820 is a light emitting diode (LED) and the audio transducer 825 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 825, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 830 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9 by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
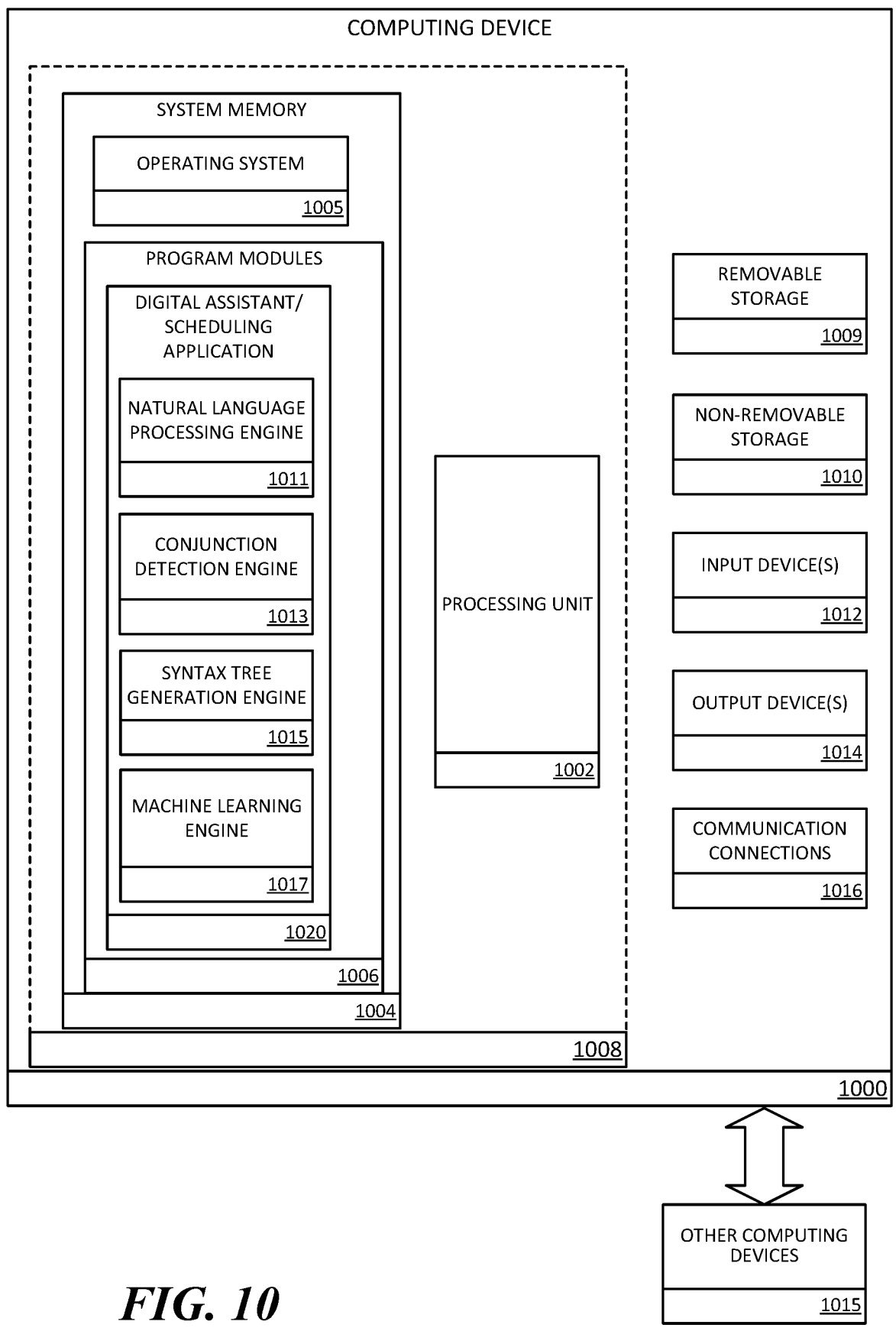
FIG. 10 is a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for assisting with scheduling meetings. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 suitable for running one or digital assistant and/or calendar applications. The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., digital assistant/scheduling application 1020) may perform processes including, but not limited to, the aspects, as described herein. According to examples, natural language processing engine 1011 may perform one or more operations associated with identifying a meeting intent in a natural language input and identifying a temporal component in a natural language input. Conjunction detection engine 1013 may perform one or more operations associated with identifying a processing initiation conjunction in a temporal component of a natural language input. Syntax tree generation engine 1015 may perform one or more operations associated with identifying syntax tree permutations to generate for a given temporal component of a natural language input, generating those permutations, and generating scores for those permutations corresponding a likelihood that each permutation accurately embodies a temporal intent of an ambiguous temporal component of a natural language input. Machine learning engine 1017 may perform one or more operations associated with training a syntax tree generation model to accurately identify syntax tree permutations that are most likely to accurately embody a temporal intent of an ambiguous temporal component of a natural language input, and/or training a scoring model for scoring generated syntax trees as corresponding to a likelihood that they accurately embody a temporal intent of an ambiguous temporal component of a natural language input.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer readable media and computer storage media as described herein does not include transitory media such as a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11:
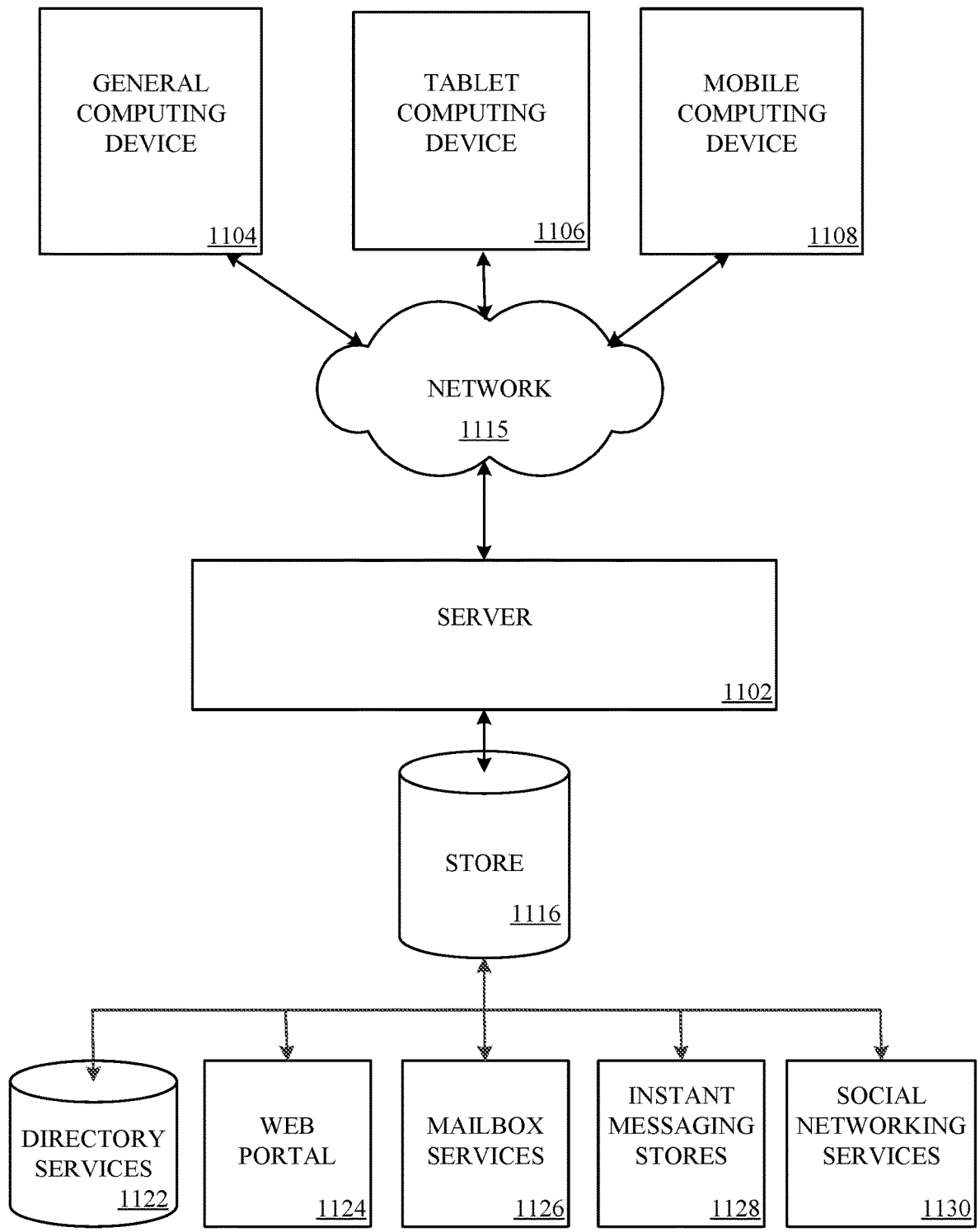
FIG. 11 is a simplified block diagram of a distributed computing system in which aspects of the present disclosure may be practiced.

FIG. 11 illustrates one aspect of the architecture of a system for processing data received at a computing system from a remote source, such as a personal/general computer 1104, tablet computing device 1106, or mobile computing device 1108, as described above. Content displayed at server device 1102 may be stored in different communication channels or other storage types. For example, various documents may be stored using a directory service 1122, a web portal 1124, a mailbox service 1126, an instant messaging store 1128, or a social networking site 1130. The program modules 1006 may be employed by a client that communicates with server device 1102, and/or the program modules 1006 may be employed by server device 1102. The server device 1102 may provide data to and from a client computing device such as a personal/general computer 1104, a tablet computing device 1106 and/or a mobile computing device 1108 (e.g., a smart phone) through a network 1115. By way of example, the computer system described above may be embodied in a personal/general computer 1104, a tablet computing device 1106 and/or a mobile computing device 1108 (e.g., a smart phone). Any of these embodiments of the computing devices may obtain content from the store 1116, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for assisting with resolving temporal ambiguities in natural language, the computer-implemented method comprising:
   receiving a natural language input comprising an electronic meeting request;
   identifying a temporal component of the natural language input;
   determining that the temporal component includes a processing initiation conjunction that separates a first temporal meeting block alternative and a second temporal meeting block alternative;
   identifying a temporal ambiguity in the first temporal meeting block alternative;
   tagging each word in the temporal component;
   utilizing the tags to generate a plurality of tree permutations for the first temporal meeting block alternative, wherein each of the permutations differs from at least one other permutation by at least one of:
      an operator,
      a temporal range, and
      an expression;
   maintaining a training data set comprising a plurality of temporally ambiguous natural language inputs;
   using the training data set to train a machine learning model to identify a most relevant permutation for a given temporally ambiguous natural language input, wherein the machine learning model calculates, for each of the plurality of tree permutations, a relevance score corresponding to each of the plurality of tree permutations' relevance to the natural language input;
   applying the trained machine learning model to each of the plurality of tree permutations; and
   surfacing a temporal meeting block alternative corresponding to the most relevant permutation for the natural language input.

2. The computer-implemented method of claim 1, wherein the plurality of tree permutations is one of: abstract syntax tree permutations, and parse tree permutations.

3. The computer-implemented method of claim 1, wherein identifying the temporal component of the natural language input comprises applying a natural language processing model to the natural language input.

4. The computer-implemented method of claim 3, wherein the natural language processing model is a semantic parsing model.

5. The computer-implemented method of claim 1, wherein the processing initiation conjunction comprises one of: "and", "&", "+", "or", a comma, and a semi-colon.

6. The computer-implemented method of claim 1, wherein the temporal ambiguity relates to an operator needed to ground at least one of: a temporal range in the first temporal meeting block alternative; and a temporal expression in the first temporal meeting block alternative.

7. The computer-implemented method of claim 6, wherein the operator comprises a modifier of the temporal range or the temporal expression.

8. The computer-implemented method of claim 6, wherein the operator comprises one of: "every", "this", "next", "any", and "following".

9. The computer-implemented method of claim 6, wherein the temporal range comprises one of: "year", "month", "week", "hour", "day", "morning", "afternoon", "evening", and "night".

10. The computer-implemented method of claim 6, wherein the temporal expression comprises one of: a specific day of a week; a specific month; a specific season; and a specific year.

11. The computer-implemented method of claim 10, wherein the temporal expression comprises one of: "Sunday", "Monday", "Tuesday", "Wednesday", "Thursday", "Friday", "Saturday", "January", "February", "March", "April", "May", "June", "July", "August", "September", "October", "November", and "December", "winter", "spring", "summer", "fall".

12. The computer-implemented method of claim 1, further comprising:
ranking each of the plurality of tree permutations based on their corresponding relevance scores.

13. The computer-implemented method of claim 1, wherein the natural language input is received by a digital assistant.

14. The computer-implemented method of claim 13, wherein the temporal meeting block alternative corresponding to the most relevant permutation for the natural language input is surfaced in an electronic message from the digital assistant.

15. The computer-implemented method of claim 14, wherein the electronic message is a meeting invite sent to a meeting invitee.

16. A system for resolving temporal ambiguities in natural language, comprising:
a memory for storing executable program code; and
one or more processors, functionally coupled to the memory, the one or more processors being responsive to computer-executable instructions contained in the program code and operative to:
receive a natural language input comprising an electronic meeting request;
identify a temporal component of the natural language input;
determine that the temporal component includes a processing initiation conjunction that separates a first temporal meeting block alternative and a second temporal meeting block alternative;
identify a temporal ambiguity in the second temporal meeting block alternative;
tag each word in the temporal component;
utilizing the tags to generate a plurality of tree permutations for the second temporal meeting block alternative, wherein each of the permutations differs from at least on other permutation by at least one of:
an operator,
a temporal range, and
an expression;
maintain a training data set comprising a plurality of temporally ambiguous natural language inputs;
use the training data set to train a machine learning model to identify a most relevant permutation for a given temporally ambiguous natural language input, wherein the machine learning model calculates, for each of the plurality of tree permutations, a relevance score corresponding to each of the plurality of tree permutations' relevance to the natural language input;
apply the trained machine learning model to each of the plurality of tree permutations; and
surface a temporal meeting block alternative corresponding to the most relevant permutation for the natural language input.

17. The system of claim 16, wherein the temporal ambiguity relates to an operator needed to ground at least one of: a temporal range in the second temporal meeting block alternative; and a temporal expression in the second temporal meeting block alternative.

18. A computer-readable storage media comprising executable instructions that, when executed by one or more processors, assists with resolving temporal ambiguities in natural language, the computer-readable storage media including instructions executable by the one or more processors for:
receiving a natural language input comprising an electronic meeting request;
identifying a temporal component of the natural language input, wherein the temporal component comprises a plurality of temporal meeting block alternatives;
determining that the temporal component includes a processing initiation conjunction that separates a first temporal meeting block alternative of the plurality of temporal meeting block alternatives and a second temporal meeting block alternative of the plurality of temporal meeting block alternatives;
identifying a temporal ambiguity in one of the plurality of temporal meeting block alternatives;
tagging each word in the temporal component;
utilizing the tags to generate a plurality of syntax tree permutations for the temporal meeting block alternative corresponding to the temporal ambiguity, wherein each of the permutations differs from at least one other permutation by at least one of:
an operator,
a temporal range, and
an expression;
maintaining a training data set comprising a plurality of temporally ambiguous natural language inputs;
using the training data set to train a machine learning model to identify a most relevant permutation for a given temporally ambiguous natural language input, wherein the machine learning model calculates, for each of the plurality of tree permutations, a relevance score corresponding to each of the plurality of tree permutations' relevance to the natural language input;
applying the trained machine learning model to each of the plurality of tree permutations; and
surfacing a temporal meeting block alternative corresponding to the most relevant permutation for the natural language input.

19. The computer-readable storage media of claim 18, wherein the temporal ambiguity relates to an operator needed to ground at least one of:
a temporal range in the temporal meeting block alternative corresponding to the temporal ambiguity; and
a temporal expression in the temporal meeting block alternative corresponding to the temporal ambiguity.

20. The computer-readable storage media of claim 18, wherein the temporal ambiguity relates to an operator needed to ground at least one of: a temporal range in the temporal meeting block alternative corresponding to the temporal ambiguity; and a temporal expression in the temporal meeting block alternative corresponding to the temporal ambiguity.

* * * * *